(12) United States Patent
Marquette

(10) Patent No.: US 8,402,870 B1
(45) Date of Patent: *Mar. 26, 2013

(54) MULTI-FUNCTION FLYING NOTCHING AND SHEARING MACHINE

(76) Inventor: Michael S. Marquette, Melrose, MN (US)

( * ) Notice: Subject to any disclaimer, the term of this patent is extended or adjusted under 35 U.S.C. 154(b) by 507 days.

This patent is subject to a terminal disclaimer.

(21) Appl. No.: 12/618,520

(22) Filed: Nov. 13, 2009

Related U.S. Application Data

(60) Provisional application No. 61/114,450, filed on Nov. 13, 2008.

(51) Int. Cl.
*B26B 1/56* (2006.01)

(52) U.S. Cl. ............ 83/284; 83/300; 83/523; 83/602; 83/613; 72/191; 72/452.4

(58) Field of Classification Search ............ 83/284, 83/285, 300, 301, 303, 308, 310, 318–320, 83/523, 601, 602, 613, 614, 627, 628, 679, 83/682, 683, 684; 76/5.1, 5.6; 72/452.1, 72/452.4–452.7, 184–191, 449

See application file for complete search history.

(56) References Cited

U.S. PATENT DOCUMENTS

| | | | |
|---|---|---|---|
| 392,362 A | | 11/1888 | Ridley |
| 1,434,478 A | * | 11/1922 | Carlson .................. 294/112 |
| 2,992,581 A | | 7/1961 | Friesz |
| 3,211,037 A | | 10/1965 | Lucien |
| 3,656,385 A | | 4/1972 | Kimbrell |
| 3,670,553 A | * | 6/1972 | Nothum et al. ............ 72/307 |
| 3,670,609 A | | 6/1972 | Contaldo et al. |
| 3,680,616 A | | 8/1972 | Rejsa |
| 3,704,643 A | | 12/1972 | Cookson |
| 3,717,058 A | | 2/1973 | Mcminn |
| 3,732,741 A | | 5/1973 | Defontenay et al. |
| 3,845,649 A | * | 11/1974 | Gerretz et al. ................ 72/189 |
| 3,972,299 A | | 8/1976 | Hasselbeck et al. |
| 3,998,119 A | | 12/1976 | Schroter |
| 4,179,962 A | | 12/1979 | Crump |
| 4,191,078 A | | 3/1980 | Steinhilber |
| 4,354,409 A | | 10/1982 | Riera et al. |
| 4,502,830 A | * | 3/1985 | Inaba et al. .................. 414/735 |
| 4,629,337 A | | 12/1986 | Teramachi |
| 4,732,489 A | * | 3/1988 | Tanaka .......................... 384/45 |
| 4,823,660 A | * | 4/1989 | Forthmann ..................... 83/123 |
| 5,048,386 A | | 9/1991 | Deluca et al. |
| 5,156,073 A | | 10/1992 | Zanzerl et al. |
| 5,195,412 A | | 3/1993 | Flemming et al. |
| 5,224,368 A | | 7/1993 | Schach |
| 5,312,220 A | * | 5/1994 | Torii et al. .................... 414/736 |

(Continued)

OTHER PUBLICATIONS

Plastics Extrusion Machinery, Inc., "Accessory Shears," "Rotary Punch," "Panel Shears," "153 Universal Profile Shear," and "140/3 Flying Knife—Specifications", HTTP;//www.pemusa.com/, Aug. 21, 2003.

(Continued)

*Primary Examiner* — Phong Nguyen
(74) *Attorney, Agent, or Firm* — Albert W. Watkins

(57) ABSTRACT

A reconfigurable flying cutting, notching and shaping machine operates upon a workpiece traveling along a generally linear axis of motion. The machine supports one or more flying tools upon one or more splined shafts and provides bearings for travel along a splined shaft in a direction of movement parallel to the direction of work travel. Rotation of the splined shaft is coupled through a double-acting cam to move one or more flying cutting tools transversely to the splined shaft.

15 Claims, 3 Drawing Sheets

U.S. PATENT DOCUMENTS

| | | | |
|---|---|---|---|
| 5,361,662 A | | 11/1994 | Levy |
| 5,383,381 A | | 1/1995 | Graham |
| 5,584,765 A | | 12/1996 | Ochiai |
| 5,724,246 A | | 3/1998 | Heil |
| 5,825,652 A | * | 10/1998 | LeBlond et al. ............ 700/132 |
| 2007/0051151 A1 | * | 3/2007 | Bodnar ........................ 72/190 |
| 2009/0120988 A1 | * | 5/2009 | Bando ............................ 225/2 |

OTHER PUBLICATIONS

Eaglematic Manufacturing Corporation, "In-Line Finish Fabricartion on the Fly", Eaglematic Tooling selection on page www.eaglematic.com on Jan. 13, 2004, 8 pages.

* cited by examiner

MULTI-FUNCTION FLYING NOTCHING AND SHEARING MACHINE

CROSS REFERENCE TO RELATED APPLICATIONS

This application claims priority to U.S. provisional patent application Ser. No. 61/114,450 filed Nov. 13, 2008 of the same title and naming the present inventor, the contents which are incorporated herein by reference in entirety.

BACKGROUND OF THE INVENTION

1. Field of the Invention

This invention pertains generally to the field of cutting. More particularly, the present invention pertains to processes of cutting during movement of the work and a flying cutter, and also to apparatus having multiple flying cutters, including multiple types of flying cutters.

2. Description of the Related Art

In modern manufacturing, there have been many high speed processes designed for many diverse industries that rely upon a continuous feed of source materials and which act upon those source materials to produce a resultant work product. These processes use machinery to automatically operate upon the source material at high speed. The throughput, or volume of product per unit of time, determines the added cost per individual product produced, since the fixed cost of a machine and the hourly labor rate for one or more machine operators is divided amongst the numbers of products produced. To better appreciate this, presume two machines cost the same to purchase and require the same amount of labor to operate. If one machine can produce 10 times the parts per hour that the other can, the higher production machine only adds one-tenth as much cost per part. This makes parts produced using the higher speed machine far less expensive, giving the owner substantial competitive advantage. As can be appreciated then, production costs and efficiencies are often determined in a large part by the throughput of the machine.

Throughput of a machine and the human labor required to operate the machine are controlled by a number of diverse and quite complex factors. One of these is the percentage of time the machine is operational. Several factors directly and significantly affect this operational percentage, including how reliable the machine is, and whether the machine can be continuously provided with all necessary source materials.

It is apparent that if the machine breaks down frequently, and requires substantial time consuming repairs to get it running again, the operational percentage is poor. In contrast, the adage "like a well-oiled machine" simply refers to a machine that just keeps running, requiring only nominal maintenance. In a well-designed machine, the maintenance required is minimal, and where ever possible is provided during the operation of the machine. Most preferably, any further maintenance may be conducted at pre-planned times or intervals between production runs, rather than after a breakdown in the middle of a production run. This may be likened to the maintenance of an aircraft. Most preferably, all necessary maintenance of an aircraft occurs between flights. The same is true for a production machine. If the machine breaks down, any in-process material may have to be manually extracted from the machine and sold or recycled as scrap or waste, further increasing labor and materials cost without producing any useful product.

Another factor that affects machine reliability for a given machine cost is the way the components of the machine are operated. When parts run in a discontinuous manner, with very fast starting and stopping, this produces large and undesirable forces within the machine. Over time, these forces will either lead to material fatigue or excessive wear. Both result in early parts failure, which in turn requires either more machine maintenance, meaning more frequent down time and less machine productivity. To avoid this extra down time, a machine may instead be built with much more expensive machine parts, either of larger and heavier build, or where that is not possible, very expensive specialty materials. Larger and heavier parts further increase inertial and frictional forces, so the parts need to be even further enlarged. As may be appreciated then, a design that requires unnecessary fast starting and stopping will in turn either need to be fabricated from much more expensive components, or it will break down frequently. This extra cost is a direct result of the operation of the machine, which is discontinuous rather than continuous.

The continuous availability of source materials is also very important to keep a machine running. Wherever possible, the source material is preferably produced in a continuous manner and then fed directly into the machine for processing. One very popular and low cost fabrication method where this is achieved is the extrusion of product. Extrusion processes are often applied to the fabrication of materials that may be melted or softened with heat. The materials are then pumped or pressed through a shaping die, and cooled sufficiently after shaping to be further processed. It will be apparent that if the extrusion press is run continuously, there will be a nearly indefinite length product produced. Examples of a few products produced using an extrusion machine are tubing, wire, rod, and sheet goods, and also various plastic and metal channels such as trim, window and door frames, and many, many other diverse products. The product may then be spooled for later use or further fabrication, or it may be immediately processed further.

In some industries, source materials are not reasonably produced simultaneously with later operations, and so in many of these cases, the source material may be provided in a large roll upon a spool or the like. Printing is but one example, where the paper fabrication is normally performed at a paper mill physically distinct from the high speed printing presses that convert the paper into magazines, newsprint, and other diverse products. In such cases, the spool will preferably be sufficiently large to be used for a relatively long period, allowing a very large quantity of finished product to be produced in a single continuous run. This may also apply to some lower volume products, where the cost of an extrusion machine may not be justified and instead the product may be supplied from a spool.

Whether from a large spool, or from a continuous extrusion process, a machine will preferably be provided with a relatively long run. However, finished product is nearly always much smaller or shorter than the roll or spool of stock material, or some segment of the extrusion, necessitating use of a cut-off apparatus to cut the stock into manageable or useful lengths. In addition, depending upon the product being produced, other operations may need to be carried out discontinuously along the length of the material. Common operations include notching or other shaping in a direction offset from the length or longitudinal axis of the extrusion or spooled stock material. Most preferably, all of these additional operations will be performed on the parts prior to cutting. Otherwise, there would need to be additional apparatus to collect the already-cut material, handling to move the cut material to a second machine, feeding equipment to move the cut material into the second machine, and the additional processing equipment. If, instead, the existing machine may be relatively simply fit with extra tools to complete these additional processes, such as notching or shaping, this alleviates the problems and expense associated with the second machine.

To perform the cutting and additional forming operations, a cutoff apparatus having a cutting tool and possibly other tools that moves in synchronization with a workpiece or stock material is commonly used. These tools are commonly referred to as flying tools, since they move at very high speed preferably at first in synchronization with the workpiece and then opposite thereto to reposition for the next operation. Typically, the tool is mounted on a carriage which in turn is slidably supported on a base for movement in a direction generally parallel with the workpiece's path of travel. The carriage accelerates from a stationary starting position along the path of travel of the workpiece until the rate of travel of the carriage equals that of the workpiece itself. Depending upon the type of workpiece involved, a clamp may be provided on the carriage for clamping the workpiece to the carriage, to assure that the workpiece is held stationary relative to the carriage prior to the cutting operation. The cutting tool is then accelerated to complete the cut, and decelerated or reversed to prepare for the next cut. After the workpiece is cut and otherwise operated upon, the carriage decelerates and returns to its starting position, in preparation for the next operation. To move the carriage and tools at this high rate of speed, hydraulic and pneumatic cylinders are frequently used. The cylinders are commonly double acting, meaning that a forward actuation extends the output shaft to accelerate the carriage to the speed of the workpiece, while reverse actuation of the cylinder retracts the output shaft, returning the carriage to its starting position. Unfortunately, precise control over these cylinders is not practical, meaning the cylinders are simply driven as quickly as possible to an extreme of travel, and then either immediately stopped or fully reversed therefrom. Control is commonly achieved using simple valves that either abruptly allow the flow of fluid to the cylinder, or that equally as abruptly cut-off flow thereto. As a result, there is a substantial amount of noise or "racket" created by these machines, as the valves open and close and the machine parts are slammed to and fro. This can at first blush appear to be very productive, a person tending to believe that the hammering sounds equate to improved speeds and productivity. However, as aforementioned, this high force acceleration of machine parts is in fact undesirable, and will necessitate either greater down time or greater cost for parts used within the machine.

Another issue relating to the cost of a production machine is the flexibility afforded by the machine. In other words, if the machine is not adaptable, it can only be used to produce a single part or type of part and will be idle when there is no demand for that part. However, an adaptable machine that can be used to produce a wide variety of parts may be operated on a nearly continuous basis, only being shut down for brief periods of simultaneous maintenance and minor tool changes.

A number of patents illustrate various flying notching and/or shearing equipment that are representative of the art. These exemplary patents and others which are provided herewith, the contents and teachings which are incorporated herein by reference, include: U.S. Pat. Nos. 3,211,037 by Lucien, entitled "Flying cutter with camway controlled actuating means"; 3,656,385 by Kimbrell, entitled "Apparatus for machine forming extruded plastic siding"; 3,670,609 by Contaldo et al, entitled "Method and apparatus for controlling shearing of metallic workpieces"; 3,704,643 by Cookson, entitled "Flying Shear"; 3,717,058 by McMinn, entitled "Fly-ing Cut-off Press"; 3,732,741 by Defontenay et al, entitled "Devices for controlling the carriage of a portable shear"; 3,998,119 by Schroter, entitled "Process and apparatus for punching sheets or webs of paper, cardboard or similar material"; 4,179,962 by Crump, entitled "Combined flying cutoff and punch"; 4,191,078 by Steinhilber, entitled "Wire cutting flying shear"; 5,195,412 by Flemming et al, entitled "Notching and shearing machine for exterior siding panels and method of using same"; 5,224,368 by Schach, entitled "Flying die machine"; 5,361,662 by Levy entitled "Moving hydraulic press"; and 5,383,381 by Graham, entitled "Double cut die set". Several additional cam operated machines, the contents and teachings which are incorporated herein by reference, include 3,680,616 by Rejsa, entitled "Method and apparatus for severing food products"; 3,972,299 by Hasselbeck et al, entitled "Can body trimmer"; and 4,354,409 by Riera et al, entitled "Flying cutoff machine".

Finally, other US patents for which the contents and teachings are incorporated by reference include U.S. Pat. Nos. 392,362 by Ridley, entitled "Combined punching and shearing machine"; 2,992,581 by Friesz, entitled "Web cutting and notching device"; and 5,724,246 by Heil, entitled "Arrangement for the controlled notching and cutting of framing components".

Webster's New Universal Unabridged Dictionary, Second Edition copyright 1983, is additionally incorporated herein by reference in entirety for the definitions of words and terms used herein.

SUMMARY OF THE INVENTION

In a first manifestation, the invention is a machine for cutting a workpiece traveling along an axis of motion. A ball spline shaft longitudinally extends on an axis generally parallel to the workpiece axis of motion, and is rotatable about the longitudinally extensive axis. A cam longitudinally reciprocates relative to the ball spline shaft and is coupled to rotate about the ball spline shaft longitudinally extensive axis upon rotation of the ball spline shaft. A flying cutting tool is operatively moved along the ball spline shaft at a rate coincident with the speed of a work piece passing through the machine. The cutting tool is coupled with the cam, to actuate responsive to cam rotation.

In a second manifestation, the invention is a flying notching and shearing machine for cutting a workpiece traveling along an axis of motion. A first ball spline shaft longitudinally extends on an axis generally parallel to the workpiece axis of motion and is rotatable about the longitudinally extensive axis. A first cam longitudinally reciprocates relative to the ball spline shaft and is coupled through a ball spline bearing to rotate about the ball spline shaft longitudinally extensive axis upon rotation of the ball spline shaft. The first cam has a groove that varies in transverse displacement from the ball spline shaft at varying angular points about the ball spline shaft longitudinally extensive axis. A first arm is coupled to a cam follower retained within the groove to provide displacing forces that alternatively move the arm transversely away from and towards the ball spline shaft. A first flying cutting tool is operatively moved along the ball spline shaft at a rate coincident with the speed of a work piece passing through the machine, and is coupled through the arm with the cam to actuate responsive to cam rotation. A second ball spline shaft longitudinally extends on an axis generally parallel to the workpiece axis of motion and is rotatable about the longitudinally extensive axis. A second cam longitudinally reciprocates relative to the second ball spline shaft and is coupled through a second ball spline bearing to rotate about the second ball spline shaft longitudinally extensive axis upon rotation of the second ball spline shaft. The second cam has a groove that varies in transverse displacement from the second ball spline shaft at varying angular points about the second ball spline shaft longitudinally extensive axis. A second arm is coupled to a second cam follower and retained within a second cam groove to provide displacing forces that alternatively move the second arm transversely away from and towards the second ball spline shaft. A second flying cutting tool is operatively moved along the second ball spline shaft at a rate coincident with the speed of the work piece passing through machine, and is coupled through the second arm with the second cam to actuate responsive to second cam rotation.

OBJECTS OF THE INVENTION

Exemplary embodiments of the present invention solve inadequacies of the prior art by supporting at least one flying tool upon a splined shaft and providing bearings for travel there along in a direction of movement parallel to the direction of work travel. Rotation of the splined shaft is coupled through a double-acting cam to move the tool transversely to the splined shaft.

A first object of the invention is to provide machinery that can receive a large spool or product emanating from a continuous extrusion process, to automatically operate upon the source material at high speed and throughput, and produce a finished product much smaller or shorter. A second object of the invention is to simplify and reduce the size and weight of the machine components to reduce inertial and frictional forces. Another object of the present invention is to provide an adaptable machine that can be used to produce a wide variety of parts may be operated on a nearly continuous basis, preferably only being shut down for brief periods of simultaneous maintenance and minor tool changes. A further object of the invention is to provide a flying cut-off apparatus to cut stock material into manageable or useful lengths, and in addition, carry out other operations discontinuously along the length of the material, most preferably prior to cutting, including notching or other shaping in a direction that may be offset from the length or longitudinal axis of the extrusion or spooled stock material.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
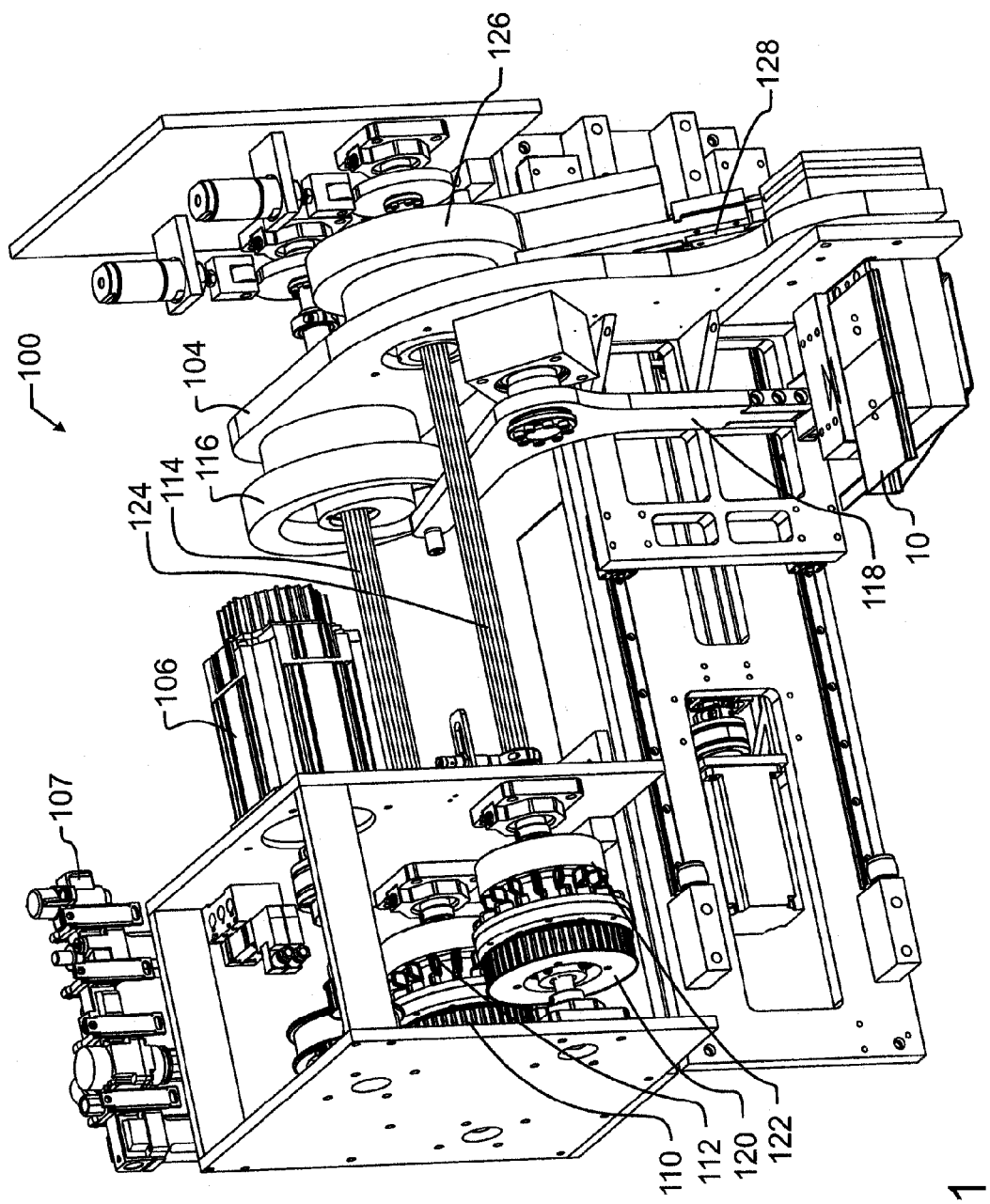
FIG. 1 illustrates a first preferred embodiment dual shaft multi-function flying notching and shearing machine designed in accord with the teachings of the present invention from projected plan view, and with a supporting stand not illustrated to provided a somewhat larger view than would otherwise be possible.

In a most preferred embodiment of the invention illustrated in FIG. 1, a dual shaft flying notching and shearing machine 100 incorporates at least one, and optionally a multitude of diverse operations upon an extrusion or other stock material in a single pass operation in a way that is compatible with high speed extrusion lines, or other high speed lines. While not limited thereto, typical work materials include plastic and aluminum extrusions. Commonly, these extrusions will require shearing at a predetermined repetitive length, and may also quite desirably have one or more additional features formed intermediate along the predetermined lengths, including the formation of one or more notches or other features.

With appropriate design and control, the preferred embodiment flying notching and shearing machine 100 is highly accurate. Most preferably, the preferred embodiment uses a computer, microcontroller, microprocessor or the equivalent to simplify the control and automation of operations.

When properly designed, the cutting and notching heads will usually be operated while traveling at the rate of travel of an extrusion or work piece through the machine, effectively rendering the cutting and notching operations stationary relative to the axis of travel of the work. The cutting and notching heads, which are located adjacent the ends of arms 118, 128, are controlled to activate and act upon the extrusion. Activation of arms 118, 128 is controlled by first providing a driving source 106, such as a motor or the like, to couple with and turn pulleys 110, 120. Pulleys 110, 120 are preferably provided with a belt or the like, not illustrated in this figure to maintain a more clear view of the clutches and pulleys, to couple driving source 106 through clutches 112, 122 to ball spline shafts 114, 124, respectively. Clutches 112 and 122 may be operated through pneumatic valves 107 or other means to activate independently of each other and of the motion of flying support 104. Consequently, activation of clutches 112, 122 may be timed with a particular position of flying support 104 along ball spline shafts 114, 124, to begin rotation of ball spline shafts 114, 124 at a particular moment.

Once ball spline shaft 114 begins to rotate, this will in turn rotate cam 116. Coupled to cam 116 is arm 118, and at the end of arm 118 is an appropriate cutting, notching or other appropriate tool designed to act upon an extrusion. Rotation of ball spline shaft 114 is entirely independent of shaft 124, and so a second cam 126 may move a second arm 128 independently of movement of arm 118. Where desired or necessary, additional flying supports similar to flying support 104 may be provided. Furthermore, while two ball spline shafts 114, 124 are illustrated herein, fewer or more such shafts may be used, the number which is determined by reasonable considerations that the designer reasonably skilled in this field will understand. Consequently, it is possible with the present invention, with nominal tooling changes, to adapt the present machine to a variety, and plurality where so desired, of notching, shaping and shearing operations. The cutting and notching tools may be carried or supported upon any suitable machine stand or support.

Figure 2:
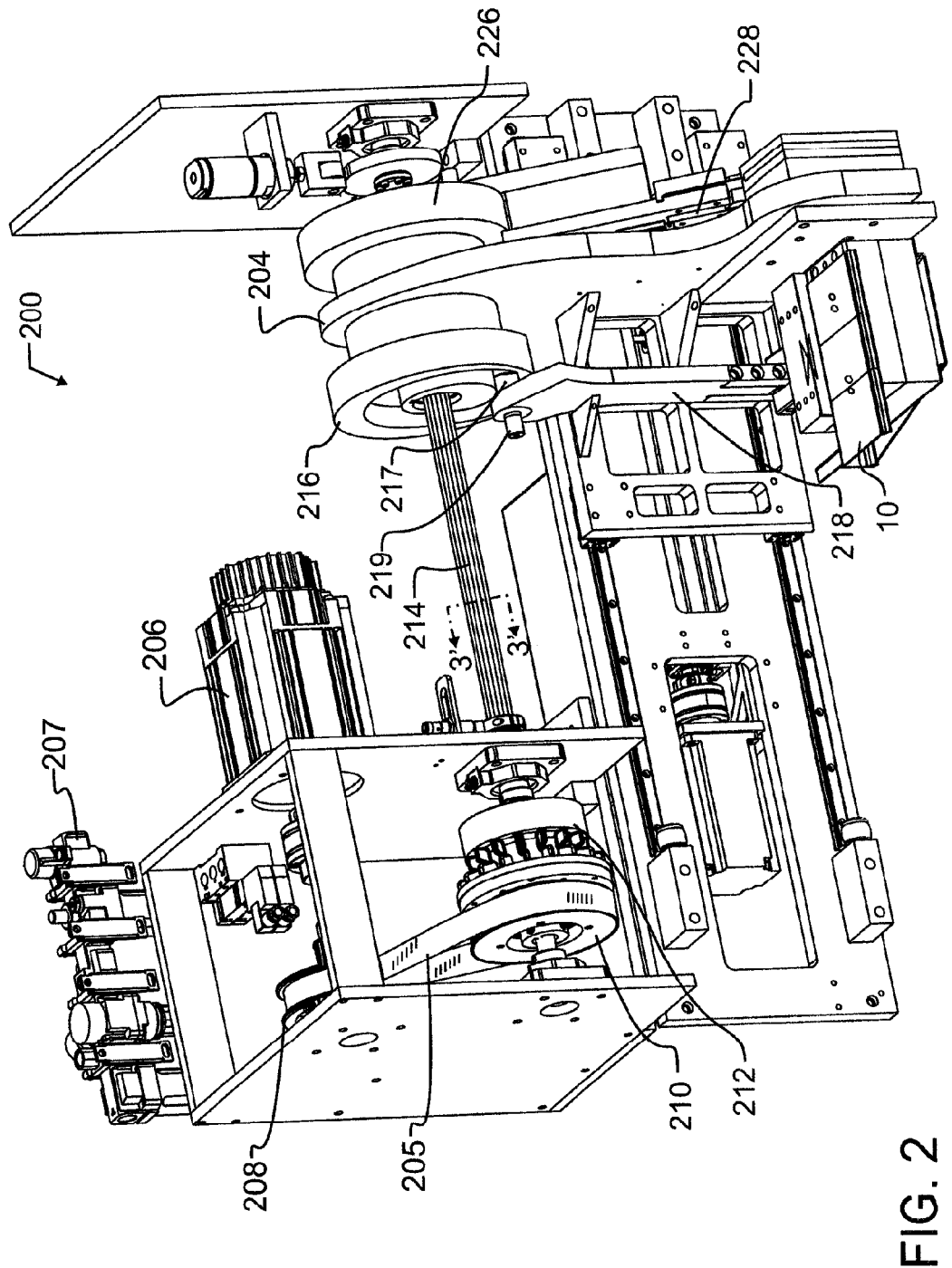
FIG. 2 illustrates a second preferred embodiment single shaft multi-function flying notching and shearing machine designed in accord with the teachings of the present invention from projected plan view.

FIG. 2 illustrates a second preferred embodiment flying notching and shearing machine 200, which as illustrated only has a single ball spline shaft 214. For ease of understanding, as illustrated and described herein, the hundreds reference numeral designation refers to the embodiment, while similar tens and ones combinations between different embodiments will be understood to be similar in structure and function. For example, ball spline shaft 214 is similar or identical to ball spline shaft 114, but is located on flying notching and shearing machine 200 rather than on flying notching and shearing machine 100.

Flying notching and shearing machine 200 is configured for basic operation. As shown in FIG. 2, a workpiece 10, which may for exemplary purposes include a plastic extrusion or any other suitable stock material, is shown entering from the right. It is preferably fed through a gauge which meters very accurately the amount of material which has passed through. In the preferred embodiment, this gauge is freestanding on a separate stand, though it will be understood that this stand may be formed integrally with the balance of the machine or may alternatively be attached adjacent to an extrusion machine or at any other suitable position in the path of an extrusion or stock material.

Workpiece 10 next passes into the body of flying notching and shearing machine 200, where cutting and notching heads may be located. The cutting and notching heads are driven reciprocally along and parallel with shaft 214, in one direction to track the movement of workpiece 10 and then in the other to reset. These heads may serve as the guides to retain workpiece 10 within flying notching and shearing machine 200, or additional structure may be provided, such as will be apparent to those versed in the art and dependent upon the material, geometry, and speed of workpiece 10. Vertical actuation of the cutting and notching heads is controlled through the rotation of cam 216. This rotation is generated by a servo-motor 206, which couples through a belt 205 and pulley 208 into pulley 210. Since there is only a single shaft 214, no clutch is required and instead servo-motor 206 may be directly controlled. Rotation of shaft 214 results in rotary motion of cam 216. Rotary motion of cam 216 is converted into linear vertical travel of arm 218 by bearing follower 217 which is anchored to arm 218 by nut 219.

Figure 3:
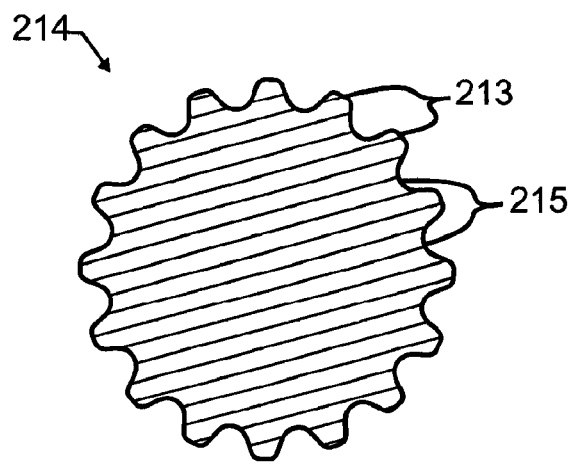
FIG. 3 illustrates a cross-section of the recirculating ball spline shaft used within the preferred embodiments of FIGS. 1 and 2 by cross-section view taken along line 3' of FIG. 2.

FIG. 3 illustrates by cross-section view the ball grooves 215 and splines 213 formed in ball spline shaft 214. Ball spline bearings are a special type of linear motion bearing that are used to provide nearly frictionless linear motion while allowing the shaft to transmit torque simultaneously. For the purposes of the present disclosure, several exemplary patents illustrating ball spline bearings are incorporated herein by reference, including U.S. Pat. Nos. 4,629,337 by Teramachi, entitled "Ball spline bearing" and 5,584,765 by Ochiai, entitled "Ball spline with liner member", though it will be understood that these patents are merely exemplary of the technology and not limiting thereto. Ball grooves 215 are ground along the length of shaft 214, thus forming splines 213 for the recirculating balls to run inside. The shell 253, visible best in FIG. 4, at the center of cam 216 that houses the balls is called a nut rather than a bushing, but is not a nut in the traditional sense—it is not free to rotate about the shaft, but is free to travel up and down the shaft.

Figure 4:
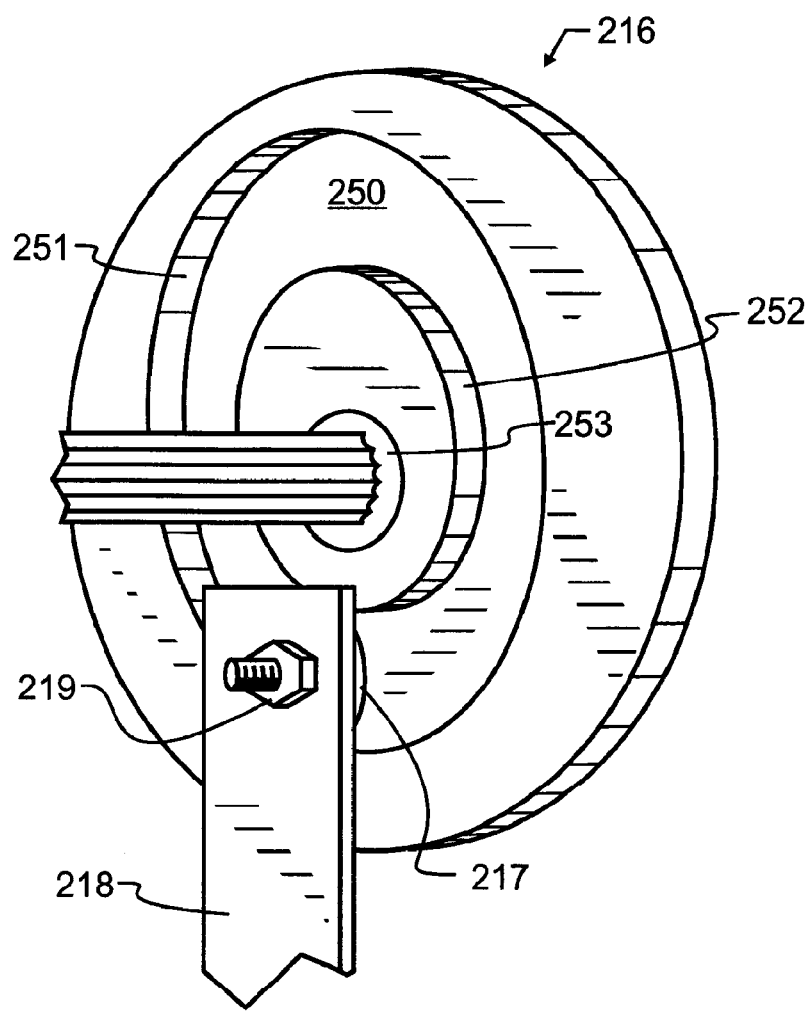
FIG. 4 illustrates the preferred cam and internal bearing follower used within the preferred embodiments of FIGS. 1 and 2 by enlarged projected view.

FIG. 4 illustrates the operation of cam 216 in much greater detail. The geometry of cam 216 may be changed to accommodate both the composition used and the geometry of extrusion 10, and also the type of operation being performed. In other words, the travel of arm 218 is readily and precisely controlled in a vertical direction by the particular shape machined into the interior of cam 216. A guide groove or valley 250 is formed, having an outer wall 251 and inner wall 252. Movement of arm 218 is very precisely controlled, in both an upward and downward direction, by the geometry of walls 251, 252. In contrast with cam 216, air or similar cylinders might be used to move arm 218. However, such air cylinders are driven by a blast which must have enough force to carry through the entire operation. Consequently, all components, including extrusion 10, tend to slam undesirably during the vertical travel of arm 218. These forces are known in the prior art to be great enough to destroy linear bearings and the cylinders themselves. No adjustment may be made for particular moments during the operation. In the case of the present invention, cam 216 may have inner wall 252 shaped to provide a very gentle slope, translating into little movement and high force, where a tougher portion of a cut or notch is required. Likewise, arm 218 may be slowed down prior to the end of the stroke, and then gently reversed and accelerated during mid-travel, and again slowed close to the opposite end of the stroke. Consequently, the force and speed of travel may be customized for a particular operation, and at any point in the travel of an arm. Owing to the continuous nature of guide groove 250, the movement of arm 218 is also continuous and smooth, rather than discontinuous.

As extrusion 10 exits the machine to the left, in the preferred embodiment there is an underlying support structure having a table surface, and there is most preferably a vertical space between table surface and the machine cutting body. This vertical space permits the placement of a box or shipping carton underneath the outlet, such that parts may be ejected directly into the shipping carton. In the preferred embodiment, the table is at comfortable working height, whereby the status of the contents may be readily inspected, and the cartons quickly and efficiently changed during operation of the preferred embodiment cutting and notching. With proper configuration, the preferred embodiment is additionally able to drop waste slugs into a chute for collection and recycling or disposal, while simultaneously dropping finished extrusions into a shipping carton.

As will be apparent to those reasonably skilled in the art, while the present machine is designed for use in association with one particular geometry, dimension and material of extrusion, the concepts illustrated herein will be applicable for a nearly unlimited number of extrusion geometries and materials. Consequently, the particular material and geometry illustrated herein for which the present machine is designed is merely for exemplary purposes and is in no way limiting to the scope of the invention.

A flying notching and shearing machine designed in accord with the teachings of the present invention may be manufactured from a variety of materials, including metals, resins and plastics, ceramics or cementitious materials, and other suitable materials, or even combinations or composites of the above. In the case of the cams 116, 126, 216, a preferred material is a nylon such as may be used in the fabrication of gears. The use of a polymer such as nylon helps to ensure a very long, trouble free, low wear life.

While the foregoing details what is felt to be the preferred embodiment of the invention, no material limitations to the scope of the claimed invention are intended. Further, features and design alternatives that would be obvious to one of ordinary skill in the art are considered to be incorporated herein. For exemplary purposes, but not limiting thereto, the speed of the flying cutting heads parallel to the axis of work travel will, for most applications, preferably exactly match the speed of the workpiece. However, there may be applications where relative displacement therebetween is either tolerable or desirable. In addition, while the foregoing description may imply that only a single operation occurs at each tool head, it will be appreciated that with proper tool design, notches immediately adjacent to a shear may be formed within the same cutting head through a sequentially activated cutter, or with appropriate cutter head geometry. Consequently, the scope of the invention is set forth and particularly described in the claims herein below.

I claim:

1. A machine for cutting a workpiece traveling along an axis of motion, comprising:
    a ball spline shaft longitudinally extensive on an axis generally parallel to said workpiece axis of motion and rotatable about said longitudinally extensive axis;
    a cam longitudinally reciprocating relative to said ball spline shaft and coupled to rotate about said ball spline shaft longitudinally extensive axis upon rotation of said ball spline shaft; and
    a flying cutting tool operatively moved along said ball spline shaft at a rate coincident with the speed of a work piece passing through said machine, and coupled with said cam to actuate responsive to said cam rotation.

2. The machine for cutting a workpiece of claim 1, wherein said cam further comprises a disc having a feature formed in a major surface that couples to said flying cutting tool.

3. The machine for cutting a workpiece of claim 2 wherein said feature further comprises a groove in a face of said cam, said groove having inner and outer sidewalls.

4. The machine for cutting a workpiece of claim 3, further comprising:
    a cam follower traversing within said groove and acted upon by both said inner and outer side walls, said inner and outer side walls thereby serving as both displacing force and return force; and
    an arm coupling said cam follower to said flying cutting tool.

5. The machine for cutting a workpiece of claim 4, wherein said cam follower is supported by said arm and projects into said groove therefrom, and said arm extends generally radially from said ball spline shaft.

6. The machine for cutting a workpiece of claim 4, wherein said groove defines a continuous path that fully circumscribes said ball spline shaft and varies in transverse displacement from said ball spline shaft at varying angular points about said ball spline shaft longitudinally extensive axis.

7. The machine for cutting a workpiece of claim 1, wherein said cam further comprises a durable and lubricious polymer.

8. The machine for cutting a workpiece of claim 7, wherein said cam further comprises nylon.

9. The machine for cutting a workpiece of claim 1, further comprising a ball spline bearing coupling said cam to said ball spline shaft.

10. The machine for cutting a workpiece of claim 1, further comprising:
    a second ball spline shaft longitudinally extensive on an axis generally parallel to said workpiece axis of motion and rotatable about said longitudinally extensive axis;
    a second cam longitudinally reciprocating relative to said second ball spline shaft and coupled to rotate about said second ball spline shaft longitudinally extensive axis upon rotation of said second ball spline shaft; and
    a second flying cutting tool operatively moved along said second ball spline shaft at a rate coincident with said speed of said work piece passing through said machine, and coupled through said second cam to actuate responsive to said second cam rotation.

11. The machine for cutting a workpiece of claim 1, further comprising:
    a second cam longitudinally reciprocating relative to said ball spline shaft and coupled to rotate about said ball spline shaft longitudinally extensive axis upon rotation of said ball spline shaft; and
    a second flying cutting tool operatively moved along said ball spline shaft at a rate coincident with the speed of a work piece passing through said machine, and coupled with said cam to actuate responsive to said cam rotation, said first and second flying cutting tools conducting independent operations upon said work piece.

12. The machine for cutting a workpiece of claim 1, wherein said flying cutting tool further comprises a shearing and notching tool.

13. The machine for cutting a workpiece of claim 11, wherein said first flying cutting tool further comprises a shearing tool and said second flying cutting tool further comprises a punching tool.

14. A flying notching and shearing machine for cutting a workpiece traveling along an axis of motion, comprising:
    a first ball spline shaft longitudinally extensive on an axis generally parallel to said workpiece axis of motion and rotatable about said longitudinally extensive axis;
    a first cam longitudinally reciprocating relative to said ball spline shaft and coupled through a ball spline bearing to rotate about said ball spline shaft longitudinally extensive axis upon rotation of said ball spline shaft, said first cam having a groove that varies in transverse displacement from said ball spline shaft at varying angular points about said ball spline shaft longitudinally extensive axis;
    a first arm coupled to a cam follower retained within said groove to provide displacing forces that alternatively move said arm transversely away from and towards said ball spline shaft;
    a first flying cutting tool operatively moved along said ball spline shaft at a rate coincident with the speed of a work piece passing through said machine, and coupled through said arm with said cam to actuate responsive to said cam rotation;
    a second ball spline shaft longitudinally extensive on an axis generally parallel to said workpiece axis of motion and rotatable about said longitudinally extensive axis;
    a second cam longitudinally reciprocating relative to said second ball spline shaft and coupled through a second ball spline bearing to rotate about said second ball spline shaft longitudinally extensive axis upon rotation of said second ball spline shaft, said second cam having a groove that varies in transverse displacement from said second ball spline shaft at varying angular points about said second ball spline shaft longitudinally extensive axis;
    a second arm coupled to a second cam follower retained within said second cam groove to provide displacing forces that alternatively move said second arm transversely away from and towards said second ball spline shaft; and
    a second flying cutting tool operatively moved along said second ball spline shaft at a rate coincident with said speed of said work piece passing through said machine, and coupled through said second arm with said second cam to actuate responsive to said second cam rotation.

15. The flying notching and shearing machine of claim 14, wherein said first flying cutting tool further comprises a shearing tool and said second flying cutting tool further comprises a punching tool.

* * * * *